Nov. 25, 1958 J. O. DICK 2,862,185
ELECTRONIC FM/FM TO ANALOG OR DIGITAL CONVERTER
Filed June 29, 1956
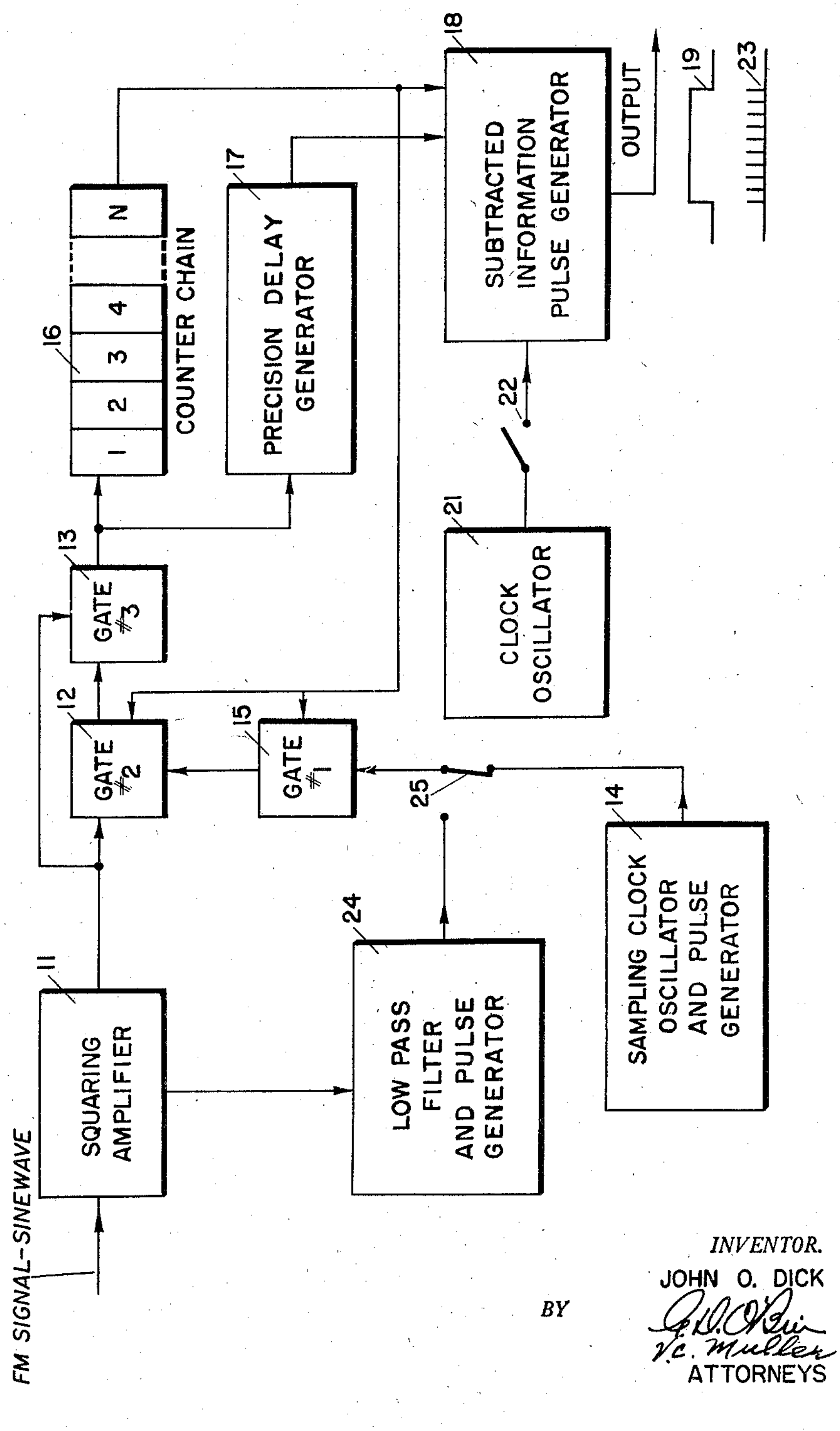
INVENTOR.
JOHN O. DICK
BY
ATTORNEYS 2,862,185

ELECTRONIC FM/FM TO ANALOG OR DIGITAL CONVERTER

John O. Dick, Riverside, Calif., assignor to United States of America as represented by the Secretary of the Navy Application June 29, 1956, Serial No. 595,028

3 Claims. (Cl. 332—1)

(Granted under Title 35, U. S. Code (1952), sec. 266)

The invention described herein may be manufactured and used by or for the Government of the United States of America for governmental purposes without the payment of any royalties thereon or therefor.

This invention relates to electrical transmission systems of the FM/FM type and more particularly to means for very precisely converting, with respect to accuracy and linearity, the information contained in a frequency modulated carrier from a function of frequency to either a function of pulse duration or to digital information.

Commonly used methods for this purpose convert frequency deviation into a voltage by means of resonant circuits and vacuum tubes; however, the previous methods depend for their accuracy upon electronic components which are highly subject to drift and temperature variation resulting in a low order of accuracy.

Briefly stated, one preferred embodiment of the converter of the present invention consists essentially of a squaring amplifier which shapes into a square wave, the FM sine wave signal carrying the information, and some form of pulse generator which provides a sampling gate pulse to control a series of gates which pass only complete square waves. The square waves then pass through a counter chain which counts a definite number of square waves and also through a precision delay generator, the output of both going to a subtracted information pulse generator which may have a digital output or an output pulse of variable time duration equal to the difference between the time required for the counter chain to count a fixed number of pulses and the time required for the first wave to pass through the precision delay thus providing a very accurate measure of the information contained in the frequency modulated input signal.

One object of the present invention is to provide an improved method and means for converting FM/FM signals to a function of time or digital information.

Another object of the present invention is to provide accurate means for converting the information contained in a frequency modulated carrier from a function of frequency to a function of pulse duration or digital information, which is not subject to drift and temperature variation and therefore provides a high degree of accuracy and linearity in the analog or digital output.

Other objects and many of the attendant advantages of this invention will be readily appreciated as the same becomes better understood by reference to the following detailed description when considered in connection with the accompanying drawing wherein:

The single figure of the drawing is a block diagram illustrating one preferred embodiment of the converter of the present invention with several alternate modes of operation selectively actuated by means of suitable switches.

Referring now to the drawing in detail, one preferred embodiment of the present invention is illustrated wherein the input signal is in the form of a frequency modulated sine wave which will have a substantialy constant frequency during the sampling period and is applied to the squaring amplifier 11 where the FM sine wave signal is shaped into a square wave and applied to gate #2 and also to gate #3 indicated by the numerals 12 and 13 respectively.

A sampling gate pulse generated at predetermined intervals in the sampling clock oscillator and pulse generator 14 is applied to gate #1 indicated by the numeral 15 which opens thus priming gate #2 so that upon receiving the first negative going portion of the signal gate #2 will open thus opening gate #3 which passes only complete square waves and eliminates the possibility of gating in the center of a cycle and producing false information.

Square waves passed by gate #3 are concurrently applied to the counter chain 16 and also to the precision delay generator 17.

The counter chain 16 counts any desired number N of square waves where the number N is determined by the sampling rate and the degree of accuracy required. However, the number N multiplied by the sampling rate cannot exceed much over 90 percent of the minimum FM carrier frequency, as circuit recovery time is necessary.

At the end of the count of a predetermined number of square waves the output of the counter chain 16 is fed as a pulse to the subtracted information pulse generator 18.

The square waves from gate #3 are also connected to the precision delay generator 17, comprising a highly precise circuit whose action is initiated by the first square wave to pass gate #3 and which is adapted to generate a pulse output a certain time after the first square wave is applied.

The output of the precision delay generator 17 is fed as a second input to the subtracted information pulse generator 18. The delay generated is chosen to be equal to the period of N cycles of either the FM carrier maximum frequency or the FM carrier minimum frequency. Thus, when the output pulse from the counter chain 16 is used as a turn-on pulse for the subtracted information generator, then the delay in the precision delay generator 17 would be equal to the period for N cycles of the FM carrier minimum frequency, and the precision delay pulse is used as a turn-off pulse so that the resultant output pulse from the subtracted information pulse generator is a very accurate measure of information contained in the frequency modulated signal. The variable duration pulse output 19 from the subtracted information pulse generator 18 can then be converted to a voltage in conventional circuitry (not shown) well known in the art.

If desired, the delay generated by the precision delay generator 17 could be made equal to the period for N cycles of the FM carrier maximum frequency, and the output pulse would then be used as a turn-on pulse for the subtracted information generator 18, and the output pulse from the counter chain 16 would be used as a turn-off pulse for the subtracted information generator 18.

As illustrated in the figure of the drawing, the turn-off pulse generated by the counter-chain 16 is also connected to gates #1 and #2 to recycle these gates and prepare them for the next sampling gate pulse from the sampling clock oscillator and pulse generator 14.

If desired, a digital output may be provided from the subtracted information pulse generator 18 by means of the clock oscillator 21 which may be associated therewith through a switch 22. In this mode of operation the subtracted information pulse generator 18 functions as a gate circuit to gate the clock oscillator 21 during the time interval between the pulse from the counter chain 16 and the pulse from the precision delay generator 17 to provide a digital output 23 consisting of a series of pulses at a uniform rate. A higher degree of accuracy can be obtained with this method.

For use of the converter of the present invention in conjunction with commutated FM signals, as in the system disclosed in the copending application of M. G. Pawley, Serial No. 595,027, filed June 29, 1956, for a FM/FM—PWM Telemetering Decommutator, the sampling gate pulse may be generated in a low pass filter and pulse generator 24 and connected to gate #1 through switch 25. The low pass filter and pulse generator 24 would also be connected to the squaring amplifier 11 as shown or directly to the FM sine wave input. The low pass filter and pulse generator 24 serve the function of generating a sync pulse from the envelope of the commutated signal and then generating a delayed sampling pulse which opens gate #3 during a portion of the commutated channel dwell time which permits the counter chain 16 to count a predetermined number of clean pulses during a period well removed from the transiently disturbed periods at the beginning and end of the channel dwell.

Obviously many modifications and variations of the present invention are possible in the light of the above teachings. It is therefore to be understood that within the scope of the appended claims the invention may be practiced otherwise than as specifically described.

What is claimed is:

1. An electronic circuit for converting information which is a function of frequency on a frequency modulated carrier to an output signal which is a function of time comprising a squaring amplifier adapted to receive the frequency modulated sine wave input and generate a corresponding square wave output, means for providing a sampling pulse at certain intervals, a counter chain adapted to count a predetermined number of square waves and provide a pulse output at the end of said count, a precision delay generator adapted to provide a pulse output a predetermined time after initiation, a first gate adapted to receive said sampling pulse, a second gate adapted to be primed by said first gate and pass the first negative going portion of the square wave signal from said squaring amplifier, a third gate adapted to be opened by said second gate and pass only complete square waves to said counter chain and precision delay generator, and a subtracted information pulse generator adapted to receive the pulse output from said counter chain and said delay generator and provide an output signal of variable time duration.

2. A circuit as set forth in claim 1 wherein said output signal is a pulse having a substantially constant amplitude and variable time duration.

3. A circuit as set forth in claim 1 wherein a clock oscillator is provided and said subtracted information pulse generator gates said oscillator during said time duration to provide a digital output.

References Cited in the file of this patent

UNITED STATES PATENTS

| | | |
|---|---|---|
| 2,113,214 | Luck | Apr. 5, 1938 |
| 2,405,876 | Crosby | Aug. 13, 1946 |
| 2,493,627 | Grosdoff | Jan. 3, 1950 |
| 2,713,677 | Scott et al. | July 19, 1955 |

OTHER REFERENCES

Pub. I: "Analog to Digital Converters," Paper No. 56–64 for the Instrument Society of America; received Nov. 24, 1954; page 3.

Pub. II: "A Survey of Analog-To-Digital Converters," Proceedings of IRE, October 1953, page 1495.